US008415590B2

(12) United States Patent
Brown et al.

(10) Patent No.: US 8,415,590 B2
(45) Date of Patent: Apr. 9, 2013

(54) TEMPERATURE CONTROLLED ELECTRONICS TRAY

(75) Inventors: Myles E. Brown, Bothell, WA (US); John C. Pizzichemi, Bothell, WA (US); Florence L. Lopez, Mill Creek, WA (US); Robert B. Stevenson, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 1212 days.

(21) Appl. No.: 12/251,337

(22) Filed: Oct. 14, 2008

(65) Prior Publication Data

US 2010/0089895 A1 Apr. 15, 2010

(51) Int. Cl.
*H05B 1/00* (2006.01)
*A21B 1/00* (2006.01)

(52) U.S. Cl.
USPC .......... 219/209; 219/412

(58) Field of Classification Search .......... 219/209, 219/221, 385–387, 390, 402, 406–408, 412–414
See application file for complete search history.

(56) References Cited

U.S. PATENT DOCUMENTS 3,412,234 A * 11/1968 Otavka .......... 219/406
3,594,547 A 7/1971 Quinn .......... 219/529
4,352,008 A 9/1982 Hoefer et al. .......... 219/540
4,568,277 A 2/1986 MacInnes et al. .......... 432/120
5,157,240 A * 10/1992 Chow .......... 219/444.1
5,755,026 A 5/1998 Stephan et al. .......... 29/846
5,994,679 A 11/1999 DeVeau et al. .......... 219/530
6,144,013 A 11/2000 Chu et al. .......... 219/209
6,384,385 B1 5/2002 Puleo .......... 219/497
6,445,568 B1 9/2002 Baur et al. .......... 361/600
6,483,078 B2 11/2002 Sullivan .......... 219/209
6,525,298 B1 * 2/2003 Hunts .......... 219/400
6,900,411 B2 5/2005 Norton et al. .......... 219/209
7,279,659 B2 * 10/2007 Gagas et al. .......... 219/400
7,300,302 B2 11/2007 Kajiwara et al. .......... 439/485

* cited by examiner

*Primary Examiner* — Sang Paik
(74) *Attorney, Agent, or Firm* — Caven & Aghevli LLC

(57) ABSTRACT

Apparatus for housing electronic components comprising a heated enclosure comprising a bottom, a top, three sides, a substantially open front and a heating element for transmitting heat to enclosure surfaces. Perforations are located in the heated enclosure to facilitate the passage of air from one side of the heated enclosure to the other. A plenum is connected to the perforations, the plenum being configured to transmit air between the outside and inside of the heated enclosure. Completing the apparatus as control electronics comprising a power source and temperature monitoring and feedback circuitry, and insulation covering a heated portion of the heated enclosure.

16 Claims, 7 Drawing Sheets

TEMPERATURE CONTROLLED ELECTRONICS TRAY

BACKGROUND

1. Field

The present disclosure is directed to a temperature-control device for stabilizing the temperature of electronics. The disclosure has particular utility in connection with controlling or minimizing condensation on electronic components that occurs due to frequent changes in atmospheric humidity experienced when traveling between different temperature/humidity regimes, e.g. as may be experienced in airplanes, and will be described in connection with such utility, although other utilities are contemplated.

2. Description of Related Art

Many commercial airplanes are equipped with an Auxiliary Power Unit (APU). The APU is controlled by the APU Engine Control Unit (ECU). Conventional ECU's are exposed to environmental conditions that could adversely affect reliability. In particular excessive condensation may form on components inside the ECU during the rapid transition between flight environmental conditions (cold/dry) to ground environmental conditions (warm/humid). The ECU is affected by the cold flight environment because it shuts down when the APU shuts down during flight and thus heat is not continuously generated. The environment surrounding the controller unit is known to reach temperatures in the 20° F. to 30° F. range. During flight, when the ECU is off, it is "cold soaked" by the air surrounding the unit. Upon landing, the typical operating procedure calls for the APU and ECU to be turned on and the airplane's cargo doors to be immediately opened by the ground crew to begin the unloading/loading process. If the outside air is warm and humid, the cold soaked ECU will cause condensation inside the unit which could result in both the ECU and APU) to be inoperative. This situation is similar to the phenomena often observed when a cold glass of ice water appears to "perspire" on a warm humid day.

It is believed that there are currently no "drop-in" solutions, i.e., solutions that solve the described problem without requalification. Below is a list of potential solutions that have been considered but rejected:

1) Warm air directed at the rack mounted electronic box using an additional fan, and heater. For this solution, two major system components (a fan and heater) are required. These two system components add power requirements and also require control methods that remove power in fault situations and give maintenance crews an indication that a fault has occurred (or conversely that the system has no faults).

2) Heater strips attached directly to or inside the rack mounted electronic box. Adding heater strips to or inside a rack-mounted electronic box also add power requirements and constitute a significant change that would require the rack mounted electronic box to be re-qualified which is not a practical solution. Re-qualification is a significant time and labor-intensive undertaking, and is to be avoided if possible.

3) Exercising the electronic box for the entire flight so that it generates heat continuously by leaving the APU running for the entire flight. The amount of fuel required to keep the APU running for the entire flight as well as the increased maintenance costs and reduction in life of the APU is cost prohibitive, especially with jet fuel prices escalating.

4) Exercising the electronic box for the entire flight so that it generates heat continuously by either internally modifying the electronic box or developing an external breakout box which simulates a normally running APU but allows the APU to remain off. Both an internal change to the rack mounted electronic box or a separate breakout box to simulate a functioning APU would be significant and require tremendous effort to design and qualify. Therefore, this solution is not considered practical.

5) Aircraft conditioned air, with a heater, blown into the general vicinity where a heat sensitive rack mounted electronic box is located. In certain aircraft operating modes conditioned air is often cold and can be moisture laden. For such modes solution 5) would have no value and could even exacerbate the problem. Further still, even for aircraft operating modes where warm air is supplied by the aircraft air conditioning system, this solution is not nearly as efficient as the proposed embodiments of the disclosure.

There exists a continuing need for a solution to the problem of condensation on sensitive electronics that are exposed to differing humidity/temperature regimes.

SUMMARY

The present disclosure in one embodiment provides an apparatus for housing electronic components comprising a heated enclosure comprising a bottom, a top, three sides, a substantially open front and a heating element for transmitting heat to enclosure surfaces; perforations located in the heated enclosure to facilitate the passage of air from one side of the heated enclosure to the other; a plenum connected to the perforations, the plenum being configured to transmit air between the outside and inside of the heated enclosure; control electronics comprising a power source and temperature monitoring and feedback circuitry; and insulation covering a heated portion of the heated enclosure.

The present disclosure in another embodiment provides an apparatus for housing electronic components comprising a bottom having a ventilated portion; a heated shroud connected to and covering said bottom which together comprise a bottom-and-shroud combination; a plenum connected to the bottom, said plenum being configured to transmit air between the outside and inside of the bottom-and-shroud combination; control electronics comprising a power source and temperature monitoring and feedback circuitry; and insulation covering a heated portion of the shroud.

In yet another embodiment of the present disclosure there is provided an apparatus for housing electronic components comprising a bottom for supporting electronic components; a heated shroud connected to and covering said bottom which together comprise a bottom-and-shroud combination; a ventilation device connected to said bottom-and-shroud, said ventilation device being configured to transmit air between the outside and inside of the bottom-and-shroud combination; a temperature controller for maintaining an elevated temperature within said bottom-and-shroud; and thermal insulation for thermally isolating a heated portion of the shroud.

The features, functions and advantages that have been discussed can be achieved independently in various embodiments of the present disclosure or may be combined in yet other embodiments further details of which can be seen with reference to the following description and drawings wherein like numerals depict like parts.

DETAILED DESCRIPTION

The specific problem that the embodiments address is that of condensation occurring when the aircraft transitions from a cold, dry air climate such as encountered at high altitudes, to a warm, moist air environment such as found on the ground during the summer months. Cold electronics that encounter a warm, moist environment will act as catalytic surfaces for condensation of water vapor to liquid water if the electronics' surface temperature is at or below the dew point of the air in immediate contact with the electronics. The "dew point" is the temperature of the air at which water vapor will condense out and form droplets. One possible solution is to keep the electronics warmer than the dew point thereby avoiding the deposition of liquid water on the electronic component surfaces. As pointed out in the Background, there are many potential solutions, but the solution described herein has particular benefits unique to the aircraft industry.

Figure 1:
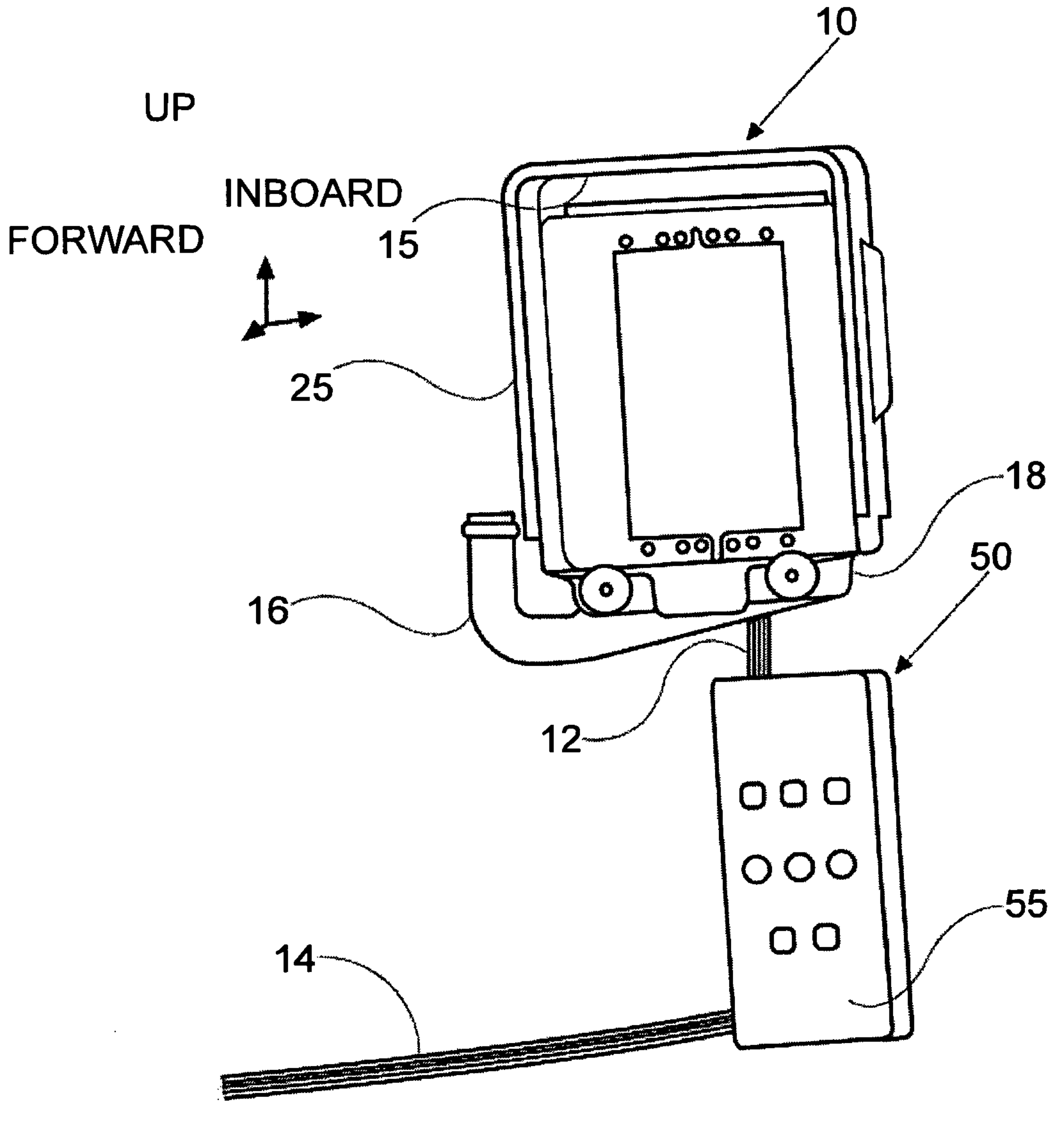
FIG. 1 is a schematic depiction of the first embodiment and shows an elevational view from the front of the aircraft.
Figure 2:
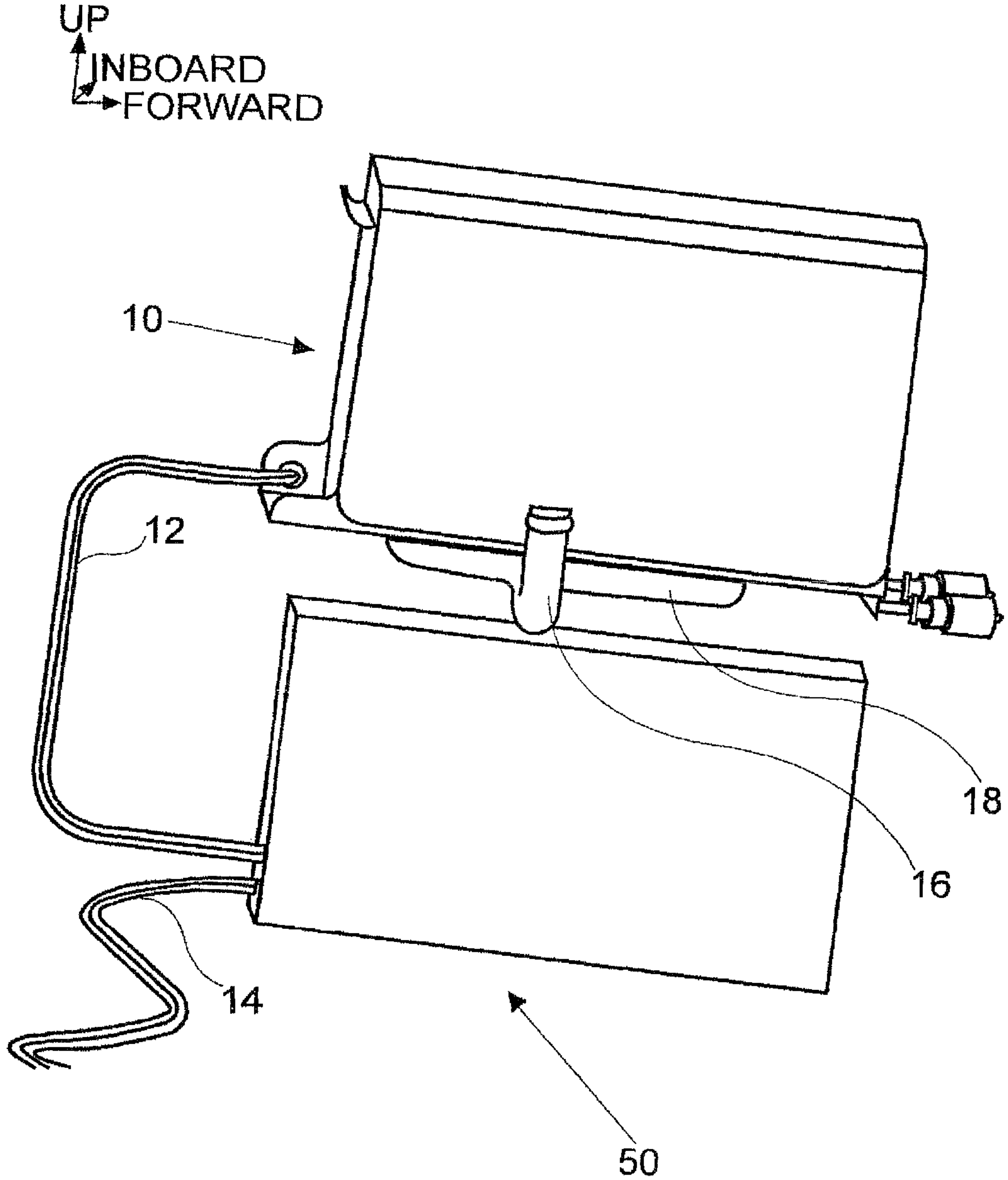
FIG. 2 is a schematic depiction of the first embodiment and shows a side elevational view from the outboard side of the aircraft.
Figure 3:
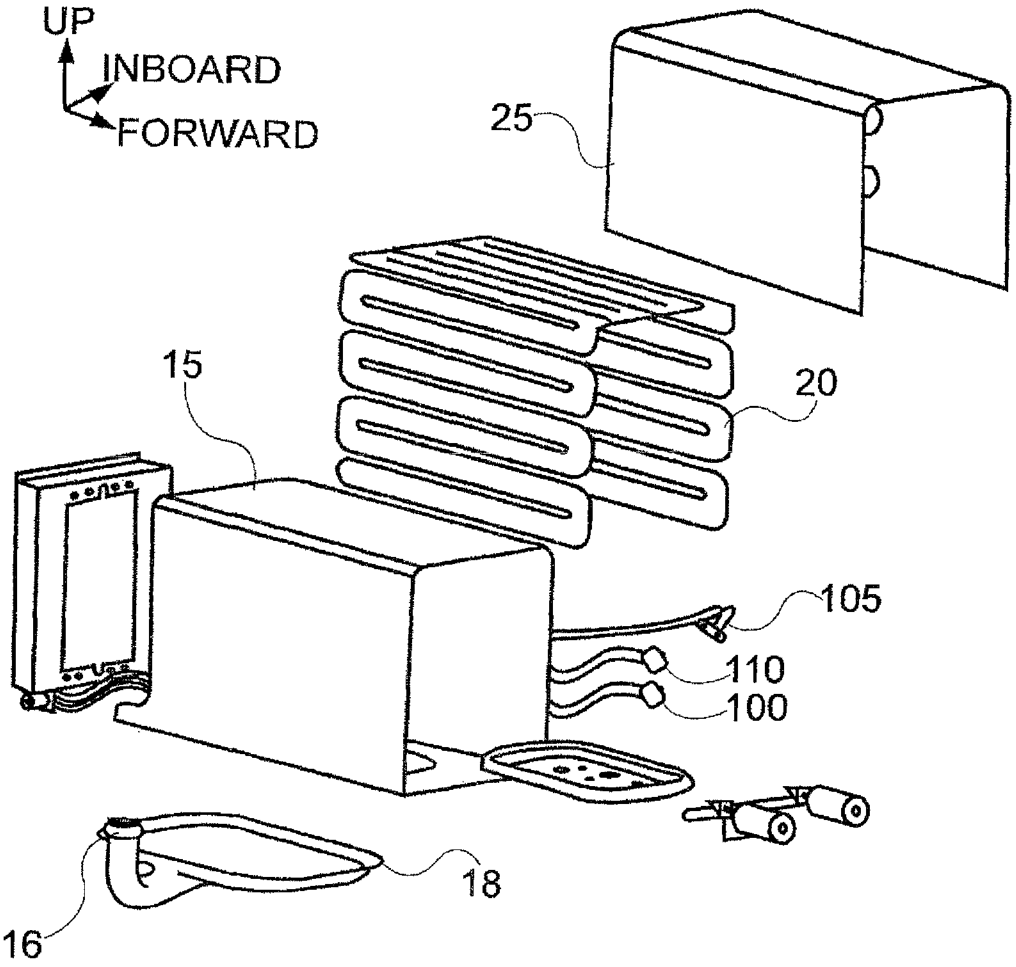
FIG. 3 is an exploded diagram of the tray/heater assembly.

A first embodiment is described generally with reference to FIGS. 1-3. FIG. 1 is a schematic depiction of the first embodiment and shows an elevational view from the front of the aircraft. Two assemblies are shown, a tray/heater assembly 10 and a control electronics assembly 50. The two are electrically interconnected via control electronics wiring bundle 12. The tray/heater assembly 10 is shown with thermal insulation 25 covering a sheet metal tray 15. Tray 15 is a one-piece design preferably made from a heat-conductive metal such as steel or aluminum or similar material. In a preferred embodiment tray 15 defines a heated enclosure comprising a bottom, a top, three sides, a substantially open front and a heating element 20 (shown in FIG. 3) for transmitting heat to enclosure surfaces. Heating element 20 is depicted as a flexible heater that may cover up to three sides of the tray. A preferred embodiment shows all three sides (top and both sides) covered by the heating element 20, although alternative embodiments may have only 1 or 2 sides covered. In yet other embodiments, the sides may be partially covered. Many alternative heating element placement designs may be used so long as the radiative energy transmitted to the interior of the tray ("heated enclosure") is adequate to heat the electronics to about 73° F. The heating element 20 preferably is located on the outside of the sheet metal tray 15, but may alternatively be located on the inside. In a preferred embodiment the interior surface of the metal tray is painted with a high emissivity paint to encourage radiation of the heat that is applied via heating element 20 to an Electronic Control Unit ("ECU") (see FIG. 4) that is held inside the tray/heater assembly. In a preferred embodiment the exterior surface of the metal tray, or alternatively the flexible heater if it is located on the exterior surface of the metal tray, is covered with thermal insulation 20 (see FIG. 3). The purpose of the thermal insulation is to direct heat inward toward the ECU and minimize the loss of heat outward and into the ambient air surrounding the insulation. The thermal insulation is necessary in order to minimize the amount of wattage necessary to maintain the internal components of the ECU at a temperature above the dew point. When the exterior of the tray 15 is heated to about 150° F., the operating temperature of the ECU's electronics has been measured at approximately 73° F., which should avoid condensation in most circumstances.

The ventilation of air through the heated enclosure allows for enhanced regulation of the temperature of the electronics contained within the ECU. To allow for air transmission, a plenum 18 preferably is provided having a series of entrances and perforations located in the heated enclosure surfaces facilitate the passage of air from one side of the heated enclosure to the other. In this first embodiment and as best depicted in FIG. 3, plenum 18 is located on the bottom of the tray 15 and sealingly engages the bottom or floor of the tray 15. The bottom or floor preferably is outfitted with perforations to allow for air transfer between the heated enclosure and the plenum.

Plenum 18 as depicted is a shallow tray with raised edges that sealingly engage the bottom of tray 15. Plenum 18 has a plenum spud or tube that provides an airflow path from the aircraft vacuum or positive air pressure source to the plenum. Either positive airflow to the heated enclosure, or vacuum source may be applied. In either case, an airflow is established through the heated enclosure that allows establishment of a stable temperature environment for the ECU electronics.

Additional optional perforations in the tray 15 may be desired to arrive at optimal temperature regulation, and in a preferred embodiment perforations through the tray metal and external insulation may be located along the top of both sides of the enclosure.

Figure 4:
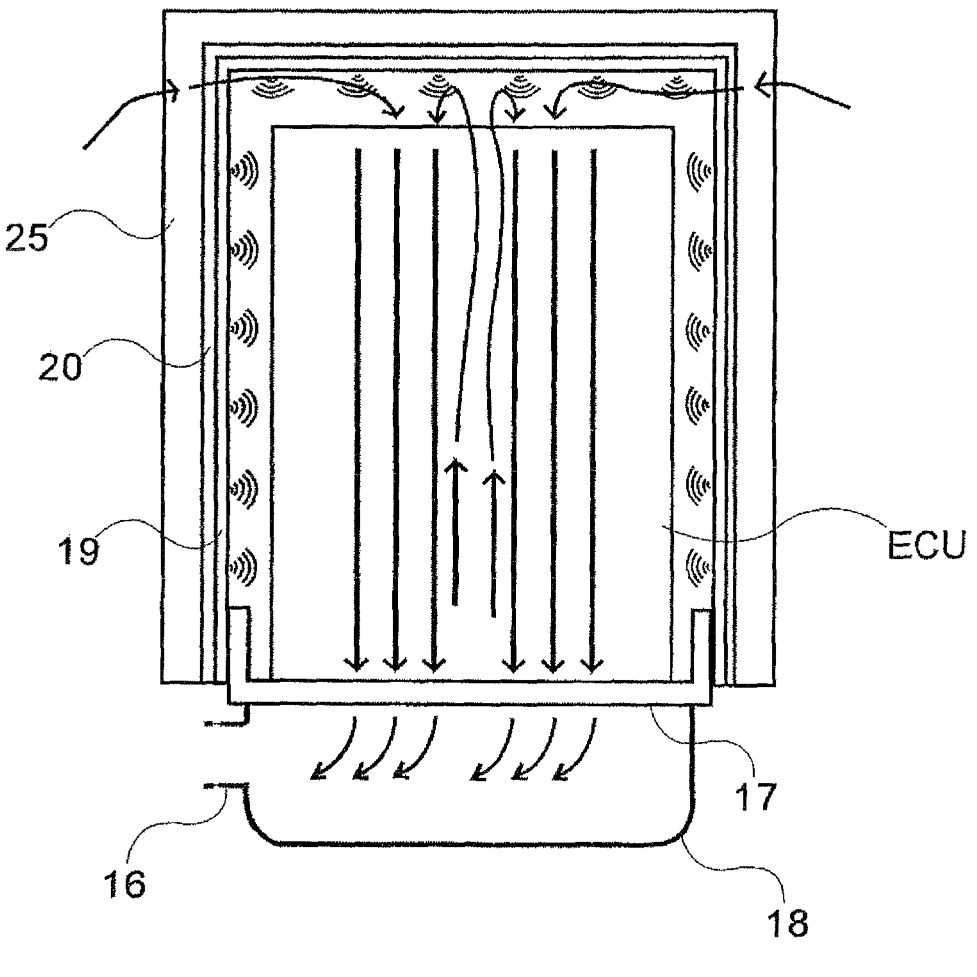
FIG. 4 is a schematic showing the second embodiment and also depicts heat and airflow.

Airflow through the heated enclosure when a vacuum source is applied to the plenum is depicted in the second embodiment (FIG. 4). With respect to FIG. 4, the ECU shown in the middle of the figure has a perforated top which allows air to be drawn through it. As vacuum is applied to the plenum 18, air is drawn into the heated enclosure through either perforations along the top surface of shroud 19, or through the front and back of the enclosure, which has openings therein. Heat is transferred by three mechanisms: first, by conduction from the heating element 20 to the metal shroud 19. Second, since the shroud is heated to about 150° F., as previously mentioned this results in radiative transfer of heat to the ECU. Third, there is also some convective heat transfer in that the air in contact with the shroud 19 will be heated to some degree and will transfer some energy to the ECU as it is drawn through.

Figure 6:
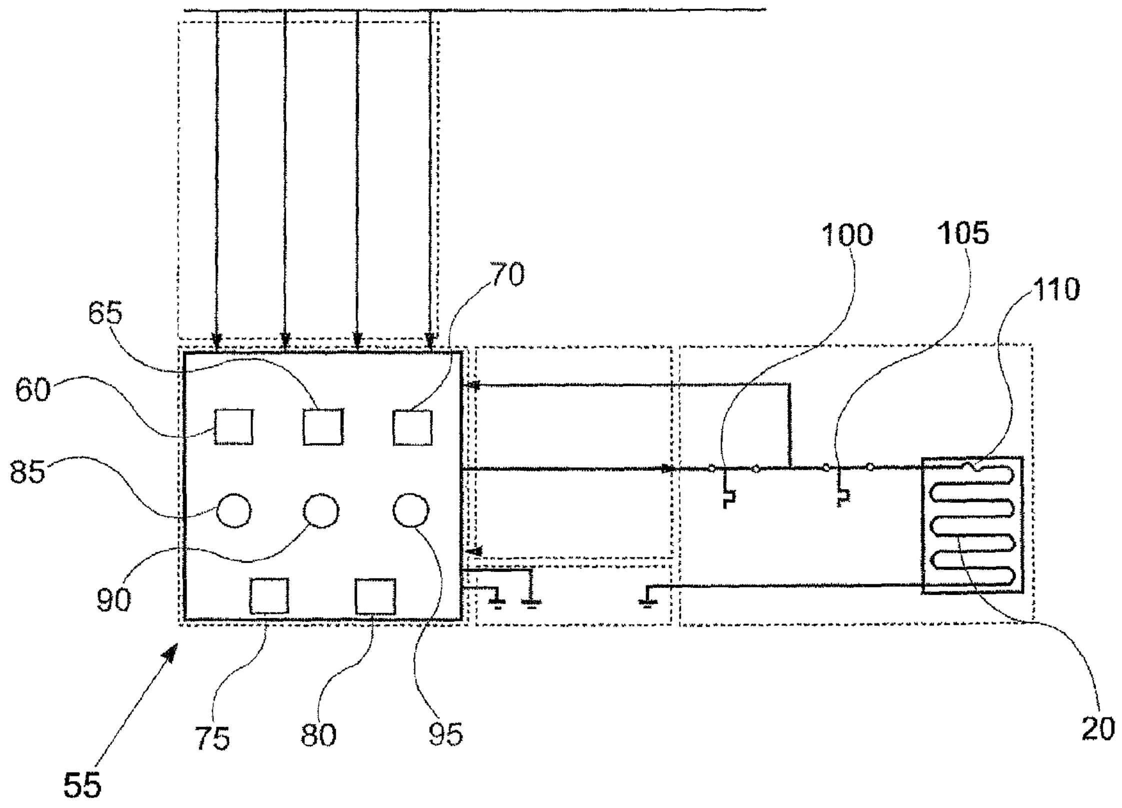
FIGS. 6 and 7 schematically illustrate the electrical architecture and schematic of the control electronics and their interconnections.
Figure 7:
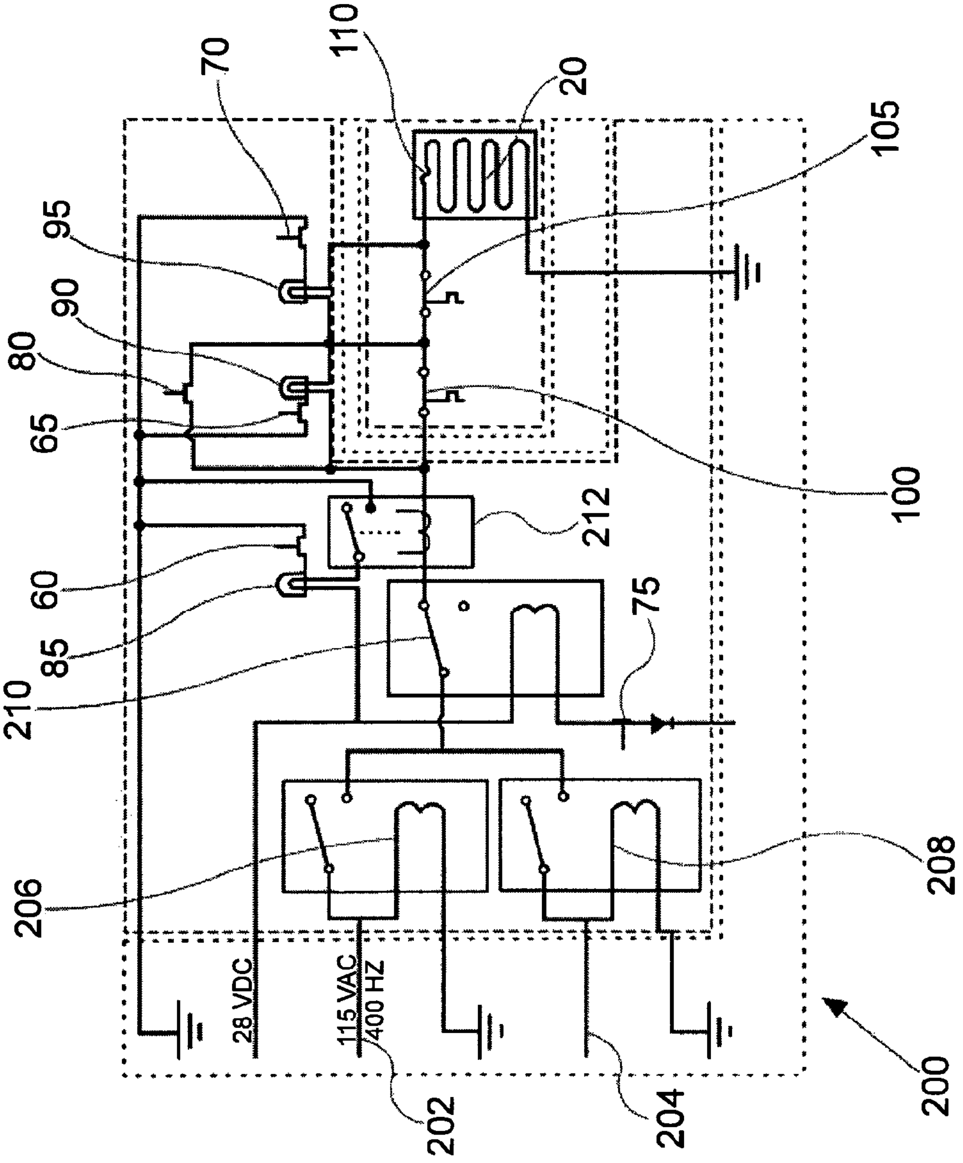

Control electronics comprising a power source and temperature monitoring and feedback circuitry are conventionally designed and used to apply power to the heater, regulate the temperature within the heated enclosure, provide for some electronic testing capability, and provide a communication link to the aircraft electronics systems. With respect to FIGS. 6 and 7, control electronics assembly 50 comprises maintenance panel 55 including test switches 60-80 and lights 85-95, electronic componentry as depicted in FIGS. 6 and 7, and connecting wire bundles 12 and 14.

Figure 5:
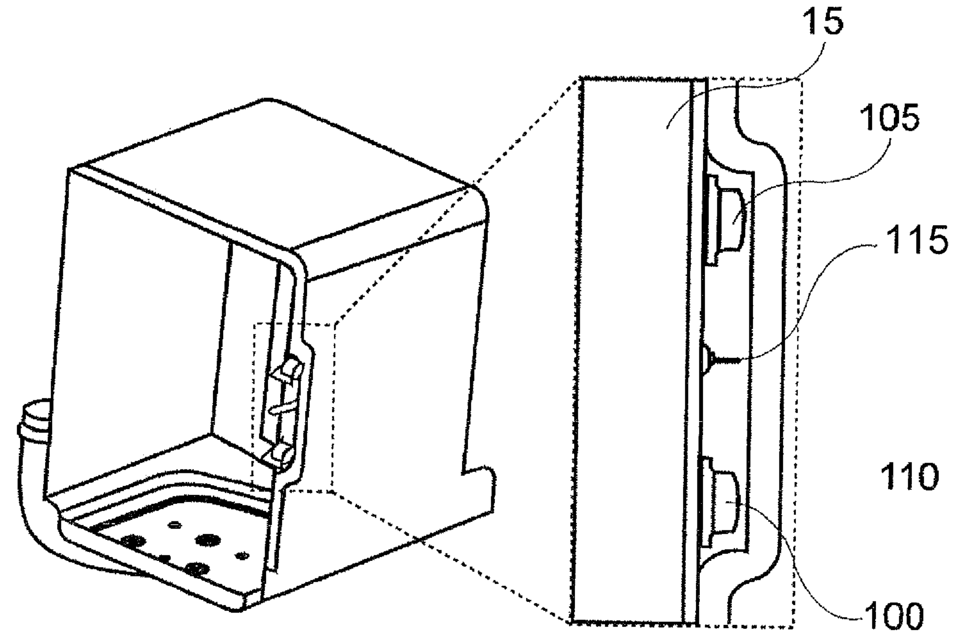
FIG. 5 is a cross section of an angular view of the tray heater assembly, with a blown-up excerpt showing the attachment points of the thermostats and thermal fuse.

FIG. 5 is a cutaway schematic of the heated enclosure showing the thermostats and a thermal fuse used in this embodiment. Primary Control Thermostat 100 and Safety Overheat Thermostat 105 are in electronic communication with the power source for the heater, as depicted in FIGS. 6 and 7. Primary Control Thermostat 100 functions to allow power to be applied to the heater until the temperature of the sheet metal tray 15 reaches the set point, at which time it is set to trip open when it reaches the set point temperature, normally in the 140-150±5° F. range. Safety Overheat Thermostat 105 functions as backup to the primary thermostat and typically has a set point temperature in the 160±5° F. range.

Thermal fuse 110 will interrupt power permanently to the heater if an excess temperature point is attained.

In this embodiment, 150° F. is the preferred set point for the Primary Control Thermostat. It has been empirically determined that a sheet metal tray temperature of 150° F. corresponds to an ECU temperature of around 73° F. This temperature allows the ECU electronics to equilibrate at a high enough temperature to counter any potential condensation. Given different embodiments than depicted herein, one of ordinary skill may empirically determine the optimal internal temperature setting that will allow avoidance of condensation. Other variables in the final temperature equilibrium include the incoming airflow and its temperature, the size and heat output of the ECU, the heat input of the heater, the amount and location of insulation, and the emissivity of the interior of the metal tray.

Electronic heaters may be of many types so long as they effectively heat the metal shroud 19 or tray 15 to the required range. A resistive type heating element that when placed in thermal contact with a body conducts heat is preferred. In the present embodiment, a flexible resistive type heating element may be used such as a KAPTON® THERMOFOIL™ heating element available from MINCO, Minneapolis, Minn. Adhesive backed heating elements are also preferred. Heating elements may be embedded into one or more components of the shroud 19 or tray 15 such as a resistive heating element such as nichrome wire. A convective type heater which circulates warmed air within the heated enclosure also may be employed. A convection heater would require a co-located fan and heater element so that warmed air could be made available within the sheet metal tray 15 or shroud 19. Yet another heating embodiment would include radiant heaters, such as ceramic or metal resistive elements positioned so as to direct radiant heat at the ECU.

Turning to FIGS. 6 and 7, a maintenance panel 55 has a plurality of test switches including a Heater On Bulb test switch 60, a Primary Thermostat Status Bulb test switch 65, a Safety Overheat Status Bulb test switch 70, a Heater Power and Primary Thermostat Status test switch 75, and a Safety Overheat Status test switch 80. Indicator lights include Heater Status light 85, Primary Thermostat Status light 90 and Safety Overheat Status light 95. As is conventional, to perform a test the desired test switch is manually depressed and held until the associated light either illuminates or stays dark, which indicates the status of the test performed. For example, in FIG. 7 if Heater On Bulb test switch 60 is depressed, 28 volt DC power is applied to Heater On Bulb 85, and if it lights that indicates the bulb is in working order. All three bulbs 85, 90, 95 may be tested in this manner. The test circuitry for testing the heater and thermostat functions operates as follows. In FIG. 7, if the Test Heater Power and Primary Control Thermostat test switch 75 is depressed, power will be applied to the heater 20 and the Heater On Bulb 85 will illuminate. If the Test Heater Power and Primary Control Thermostat test switch 75 is held in the depressed position for a sufficient period of time, the Primary Control Thermostat 100 will open, power will be removed from the heater 20, and the Primary Control Thermostat Open Bulb 90 will illuminate. If the Test Safety Overheat Thermostat test switch 70 is depressed, power will bypass the open Primary Control Thermostat 100 and the Heater On Bulb 85 will illuminate. If the Test Safety Overheat Thermostat test switch 95 is held in the depressed position for a sufficient period of time, the Safety Overheat Thermostat 105 will open, power will be removed from the heater 20, and the Safety Overheat Thermostat Open Bulb 95 will illuminate. In this manner, all elements of the system can be functionally tested by production and maintenance personnel.

FIG. 7 is a detailed electrical schematic 200 of the control electronics and their interconnections. Primary and secondary power 202 and 204 arc supplied through relays 206 and 208, respectively to a heater switch 210. A current sensor 212 supplies a signal to heater status light 85. Electrical power is then supplied through a primary temperature controller control thermostat 100 which opens and closes to maintain a target temperature and safety overheat thermostat 105 and thermal fuse 110 to heater element 20. Known equivalents to thermostats include bi-metal mechanical sensors, electronic thermistors and semiconductor devices, and electrical thermocouples. Alternatively, instead of a thermostat or equivalent device an infrared thermometer may be used to measure the temperature of the surface of the metal tray, and the information fed back to a digital comparator circuit to determine whether the measured temperature is above or below the set point.

In a preferred embodiment insulation is used to cover a heated portion of the heated enclosure. A shown in FIG. 3, the thermal insulation 25 is a unitary covering which may be manufactured as a separate body such as a blanket of fiberglass wool or sections of custom-fitted polystyrene, or it may be applied in situ as in the case of a spayed-on formulation. In any case, the desired result is to provide insulation over the heated portions of the heated enclosure so as to direct the heat inwards to irradiate the ECU or other component desired to be heated.

A second embodiment of the inventive concept as shown in FIG. 4 is an apparatus for housing electronic components comprising a bottom for supporting electronic components, a heated shroud 19 connected to and covering the bottom 17 which together comprise a bottom-and-shroud combination, a ventilator connected to the bottom-and-shroud, the ventilator being configured to move air between the outside and inside of the bottom-and-shroud combination, a temperature controller for maintaining an elevated temperature within the bottom-and-shroud, and thermal insulation for thermally isolating a heated portion of the shroud. This embodiment departs from the previous embodiment in that the heated enclosure having a bottom, a top, three sides, a substantially open front and a heating element for transmitting heat to enclosure surfaces is replaced by a bottom 17 having a ventilated portion and a heated shroud 19 connected to and covering the bottom 17 which together comprise a bottom-and-shroud combination. The shroud 19 is manufactured separate from the bottom 17, whereas in the previous embodiment the sheet metal tray 15 is a unitary construction. The ventilator may include perforations through the bottom 17 for movement of air through the bottom 17 to the plenum 18 which is sealingly attached to the bottom 17, and a source of either positive or negative air pressure applied to the plenum 18 thereby drawing air either into or out of the bottom-and-shroud. Additional perforations may be added to the top of the shroud 19 to allow for additional air exchange.

The embodiments of the present disclosure provide a significant advance in that no known solutions to the condensation problem are able to be "dropped in" to an existing architecture without major structural revision or the need to re-qualify the airframe or its avionics. That is to say, the present disclosure permits one to increase the temperature of a sensitive rack mounted electronics box to an acceptable range, i.e. to avoid condensation, without adversely impacting adjacent boxes, thus minimizing impact to current airplane designs and costs associated therewith. This provides significant resource savings in time and efficiency, not to mention the rugged nature of the embodiments of the disclosure described herein.

A further application of the embodiments presented herein is the extension of the operational envelope of the airframe utilizing one or more of the embodiments of the disclosure. An airframe using the device described herein would be able to operate in colder climates than without such a device, and therefore civilian airframes, if adapted using the inventive device described herein, would be usable under colder environmental conditions such as may be encountered in military applications. This applies regardless of the advantage of avoiding condensation effects encountered in warmer climates.

It will be understood that various modifications may be made to the embodiments disclosed herein. Therefore, the above description should not be construed as limiting, but merely as exemplifications of preferred embodiments. Those skilled in the art will envision other modifications that come within the scope and spirit of the claims appended hereto.

We claim:

1. An apparatus for housing electronic components comprising:

- a heated enclosure comprising a bottom, a top, three sides, a substantially open front and a heating element for transmitting heat to enclosure surfaces;
- perforations located in said heated enclosure to facilitate the passage of air from one side of the heated enclosure to the other;
- a plenum connected to the perforations, said plenum being configured to transmit air between the outside and inside of the heated enclosure;
- control electronics comprising a power source and temperature monitoring and feedback circuitry, wherein the control electronics comprises:
  - a primary control thermostat to regulate a temperature in the heated enclosure; and
  - a safety overheat thermostat to interrupt power permanently to the heating element if the temperature in the heated enclosure exceeds a threshold;
- insulation covering a heated portion of said heated enclosure;
- a safety overheat thermostat test switch to test the safety overheat thermostat;
- a primary control thermostat test switch to test the primary control thermostat, wherein activation of the primary control thermostat test switch for a predetermined period of time triggers safety overheat thermostat test switch.

2. The apparatus of claim 1, wherein said heated enclosure comprises at least one flexible heating element for transmitting heat to said top and sides of the enclosure.

3. The apparatus of claim 1, wherein said plenum is connected to a source of positive or negative air pressure.

4. The apparatus of claim 1, wherein perforations are made in the bottom of said heated enclosure.

5. An apparatus for housing electronic components comprising:

- a bottom having a ventilated portion;
- a shroud connected to and covering said bottom which together comprise a bottom-and-shroud combination which defines an enclosure;
- a heating element for transmitting heat to the enclosure;
- a plenum connected to the bottom, said plenum being configured to transmit air between the outside and inside of the enclosure;
- control electronics comprising a power source and temperature monitoring and feedback circuitry, wherein the control electronics comprises:
  - a primary control thermostat to regulate a temperature in the enclosure; and
  - a safety overheat thermostat to interrupt power permanently to the heating element if the temperature in the enclosure exceeds a threshold;
- insulation covering a heated portion of said shroud;
- a safety overheat thermostat test switch to test the safety overheat thermostat; and
- a primary control thermostat test switch to test the primary control thermostat, wherein activation of the primary control thermostat test switch for a predetermined period of time triggers safety overheat thermostat test switch.

6. The apparatus of claim 5, wherein said ventilated portion of said bottom comprises perforations for allowing the passage of air.

7. The apparatus of claim 6, wherein said heated shroud comprises left, right and top surfaces, said surfaces having attached thereto at least one heating element for transmitting heat to said shroud surfaces.

8. The apparatus of claim 5, wherein said plenum is connected to a source of positive or negative air pressure.

9. An apparatus for housing electronic components comprising:

- a bottom for supporting electronic components;
- a shroud having a ventilated portion and connected to and covering said bottom which together comprise a bottom-and-shroud combination which defines an enclosure;
- a heating element for transmitting heat to the enclosure;
- a plenum connected to said bottom, said plenum being configured to transmit air between the outside and inside of the enclosure;
- control electronics comprising a power source and temperature monitoring and feedback circuitry, wherein the control electronics comprises:
  - a primary control thermostat to regulate a temperature in the heated enclosure;
  - a safety overheat thermostat to interrupt power permanently to the heating element if the temperature in the heated enclosure exceeds a threshold;
- insulation covering a heated portion of said shroud;
- a safety overheat thermostat test switch to test the safety overheat thermostat; and
- a primary control thermostat test switch to test the primary control thermostat, wherein activation of the primary control thermostat test switch for a predetermined period of time triggers safety overheat thermostat test switch.

10. The apparatus of claim 9, wherein said ventilated portion of said shroud comprises perforations for allowing the passage of air.

11. The apparatus of claim 9, wherein said heated shroud comprises left, right and top surfaces, said surfaces having attached thereto at least one heating element for transmitting heat to said shroud surfaces.

12. The apparatus of claim 9, wherein said plenum is connected to a source of positive or negative air pressure.

13. An apparatus for housing electronic components comprising:

- a bottom for supporting electronic components;
- a heated shroud connected to and covering said bottom which together comprise a bottom-and-shroud combination which defines an enclosure;
- a heating element for transmitting heat to the enclosure;

a ventilator connected to said enclosure, said ventilator being configured to transmit air between the outside and inside of the enclosure;

a temperature controller for maintaining an elevated temperature within said bottom-and-shroud, wherein the temperature controller comprises:

a primary control thermostat to regulate a temperature in the heated enclosure;

a safety overheat thermostat to interrupt power permanently to the heating element if the temperature in the heated enclosure exceeds a threshold;

thermal insulation for thermally isolating a heated portion of said shroud;

a safety overheat thermostat test switch to test the safety overheat thermostat; and a primary control thermostat test switch to test the primary control thermostat, wherein activation of the primary control thermostat test switch for a predetermined period of time triggers safety overheat thermostat test switch.

14. The apparatus of claim 13, wherein said ventilator comprises perforations through the bottom, a plenum sealingly attached to the bottom, and a source of either positive or negative air pressure applied to said plenum thereby drawing air either into or out of said bottom-and-shroud combination.

15. The apparatus of claim 13, wherein said temperature controller comprises a digital control circuit.

16. The apparatus of claim 13, wherein said thermostat is selected from a bi-metal mechanical sensor, an electronic thermistor, a semiconductor temperature sensing device, and a thermocouple.

* * * * *